W. E. SEELYE.
HAND CORN-PLANTER.

No. 189,142. Patented April 3, 1877.

WITNESSES:
E. Wolff.
J. H. Scarborough.

INVENTOR:
W. E. Seelye
BY Munn & Co.
ATTORNEYS.

UNITED STATES PATENT OFFICE.

WILLIAM E. SEELYE, OF ANOKA, MINNESOTA.

IMPROVEMENT IN HAND CORN-PLANTERS.

Specification forming part of Letters Patent No. 189,142, dated April 3, 1877; application filed February 17, 1877.

*To all whom it may concern:*

Figure 1:
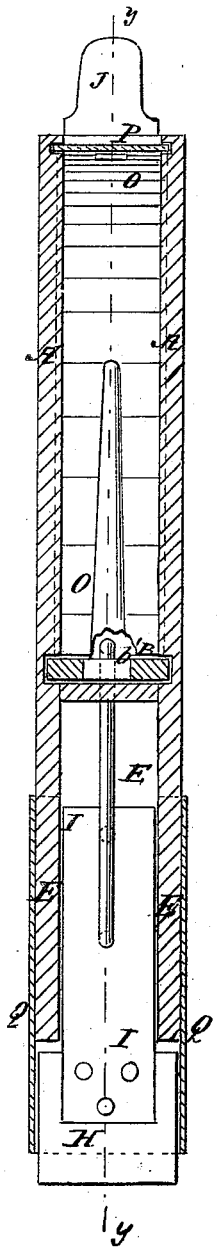
Figure 2:
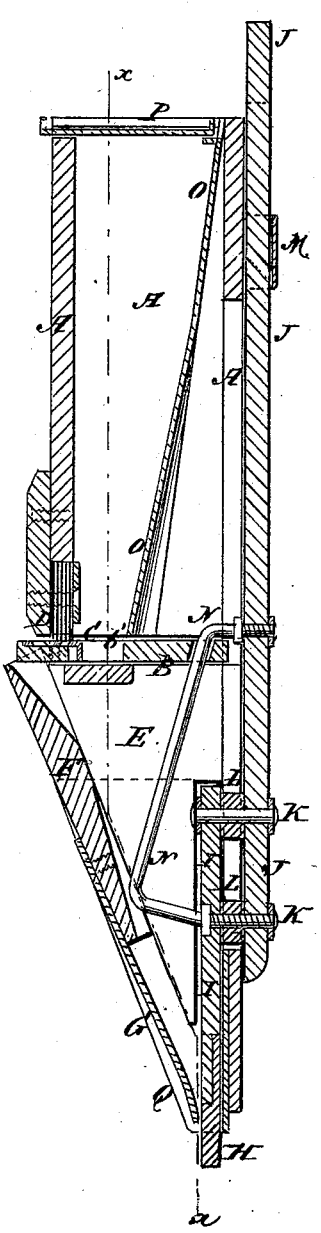

Be it known that I, W. EDWARD SEELYE, of Anoka, in the county of Anoka and State of Minnesota, have invented a new and useful Improvement in Hand Corn-Planter, of which the following is a specification:

Figure 1 is a longitudinal section of my improved hand corn-planter, taken through the line *x x*, Fig. 2. Fig. 2 is a longitudinal section of the same, taken through the line *y y*, Fig. 1.

Similar letters of reference indicate corresponding parts.

The object of this invention is to furnish an improved hand corn-planter which shall be simple in construction, convenient in use, easily operated, and reliable in operation.

The invention consists in the combination of the bar, the bolts, and the block or blocks with the plunger, the handle, and the slotted back of the planter, as hereinafter fully described.

A is the seed-box, the bottom B of which moves out and in through a transverse slot in its front, and slides in grooves in its sides. In the forward part of the slide B is formed a hole, *b'*, to receive the seed, carry it out, and drop it into the lower part of the planter. The size of the hole *b'* is regulated by an adjustable plate, C, secured to the said slide B. The slide B is kept from carrying out any more seed than enough to fill its dropping-hole *b'* by a brush, D, attached to the front of the seed-box A. The sides and back of the seed-box A are extended below the dropping-slide B, to form a chamber or spout, E, to receive the seed and convey it to the ground. The forward edges of the sides of the spout E are beveled, and the upper part of the forward side is formed by a plate, F, the upper end of which projects beyond the front of the seed-box A, and is beveled off upon its inner side to receive the seed from the dropping-slide B. The lower part of the front of the chamber E is formed of a spring-plate, G, which will spring inward to close the lower end of the chamber E when the plunger H is raised, and is pushed outward to allow the seed to drop into the ground when the said plunger is pushed down. The plunger H is attached to the lower end of the bar I, that slides up and down upon the inner surface of the back of the chamber E and seed-box A, and is connected with the lower end of the handle J, which slides upon the outer surface of said back by two bolts, K. The bolts K pass through a longitudinal slot formed in the back of the planter and through a block or blocks, L, placed in the said slot. The block or blocks L keep the bar I and handle J at the proper distance apart, and also prevent the side edges of the bar I from wearing the sides of the chamber E. The upper part of the handle J is kept in place against the back of the planter by passing through a keeper, M, attached to upper part of the said back. The dropping-slide B is moved out and in by the inclined rod N, which passes through a hole in the inner part of said slide. The ends of the rod N are bent to the rearward, and the upper end passes through the slot in the back of the planter, and is attached to the handle J. The lower end of the rod N is attached to the bar I.

The corn in the seed-box A is kept away from the slot in its back, from the inner end of the dropping-slide B, and from the rod N, by a partition, O, attached to the sides of said seed-box A. The seed-box A is provided with a cover, P. To the sides of the chamber E are attached angular metal plates Q, to prevent said sides from being worn by the soil, and to cover the spaces left at the lower ends of said sides.

Having thus described my invention, I claim as new and desire to secure by Letters Patent—

The combination of the bar I, the bolts K, and the block or blocks L, with the plunger H, the handle J, and the slotted back of the planter, substantially as herein shown and described.

WILLIAM EDWARD SEELYE.

Witnesses:
JOHN DAVIS HUTCHINS,
MATT. LAIB.